United States Patent [19]

Schirmann

[11] Patent Number: 4,760,168

[45] Date of Patent: Jul. 26, 1988

[54] PREPARATION OF ALKYL ACRYLAMIDOGLYCOLATES AND THEIR ALKYL ETHERS

[75] Inventor: Peter J. Schirmann, Fairfield, Conn.

[73] Assignee: American Cyanamid Company, Stamford, Conn.

[21] Appl. No.: 18,743

[22] Filed: Feb. 20, 1987

Related U.S. Application Data

[63] Continuation of Ser. No. 831,110, Feb. 19, 1986, abandoned, which is a continuation of Ser. No. 377,506, May 12, 1982, abandoned.

[51] Int. Cl.$^4$ .......................................... C07C 101/28
[52] U.S. Cl. .................................................... 560/170
[58] Field of Search ......................................... 560/170

[56] References Cited

U.S. PATENT DOCUMENTS 3,422,139  1/1969  Talet ................................. 560/567
4,156,093  5/1979  Christidis ......................... 560/126

FOREIGN PATENT DOCUMENTS 20000  12/1980  European Pat. Off. ............ 560/170
1004158  3/1957  Fed. Rep. of Germany ...... 560/186

Primary Examiner—Michael L. Shippen
Attorney, Agent, or Firm—Roger S. Benjamin

[57] ABSTRACT

Reaction of an acrylamide with an alkyl glyoxylate or an alkyl glyoxylate hemiacetal provides an alkyl acrylamidoglycolate which can readily be alkylated to provide the alkyl ether thereof.

2 Claims, No Drawings

PREPARATION OF ALKYL ACRYLAMIDOGLYCOLATES AND THEIR ALKYL ETHERS

This application is a continuation of application Ser. No. 831,110, filed Feb. 19, 1986 which in turn, is a continuation of application Ser. No. 377,506, filed May 12, 1982, both now abandoned.

This invention relates to a process for preparing alkylacrylamidoglycolates and their alkyl ethers. More particularly, this invention relates to such a process wherein an alkyl glyoxylate or its hemiacetal is reacted with an acrylamide to provide an alkylacrylamidoglycolate which may be subsequently etherified with a suitable alcohol.

Alkylacrylamidoglycolates and their alkyl ethers can be readily polymerized and copolymerized with all common ethylenically unsaturated comonomers such as styrene, acrylates, methacrylates, acrylonitrile and the like. When polymerized or copolymerized, alkylacrylamidoglycolates and their alkyl ethers have been shown to provide reactive sites in polymers employed as coating resins. These reactive sites may provide crosslinking by self-condensation at high temperatures or by use of added cross-linking agents such as diamines.

Alkylacrylamidoglycolates and their alkyl ethers are presently prepared by reacting an acrylamide with glyoxylic acid to provide an acrylamidoglycolic acid in monohydrate form. It is then necessary to isolate this intermediate from the mother liquor and to remove excessive water during the subsequent alkylation steps to obtain alkylacrylamidoglycolate alkyl ethers. Water removal presents a major difficulty in these current procedures. The use of expensive water scavengers such as dimethoxypropane on a molar basis is required to obtain acceptable yields of the alkyl ethers.

What is desired, therefore, is a process for preparing alkylacrylamidoglycolates and their alkyl ethers which avoids the necessity of isolating the acrylamidoglycolic acid and of removing excessive amounts of water during subsequent steps. The provision for such a process would fulfill a long felt need and constitute a significant advance in the art.

In accordance with the present invention, there is provided a process for preparing an alkylacrylamidoglycolate which comprises reacting an acrylamide with an alkyl glyoxylate or its hemiacetal in essentially equal molar proportions at a temperature in the range of about 50° C. to about 900° C. in the presence of a polymerization inhibitor.

In accordance with the present invention, there is also provided a modification of the process including the additional steps of reacting the alkyl acrylamidoglycolate with a molar excess of alcohol by distillation, said alcohol being selected from the group consisting of aliphatic and cycloaliphatic alcohols of 1-6 carbon atoms and 1,2-dihydroxy alcohols of 2-6 carbon atoms.

The process of the present invention avoids the preparation of acrylamidoglycoxylic acid monohydrate, its isolation from the aqueous mother liquor, and excessive water removal during alkylation steps. The process of the present invention allows isolation of alkylacrylamidoglycolates which was not possible employing the previously known process. The present process by simplifying processing can result in savings in costs and in higher quality products.

In carrying out the process of the present invention, an alkyl glyoxylate or an alkyl glycolate hemiacetal is reacted with an acrylamide in essentially equal molar proportions to provide an alkyl acrylamidoglycolate. Although variations in the molar ratio of reactants is possible, no advantage appears to result from such variations and purer products and better yields arise at essentially equal molar proportions.

The useful alkyl glyoxylate hemiacetals will have the structure (I) and the alkyl glyoxylates will have the structure (II):

wherein each R is individually, an aliphatic or cycloaliphatic radical containing 1 to 6 carbon atoms, or a hydroxyaliphatic or hydroxylcycloaliphatic radical containing 2-6 carbon atoms in which the hydroxyl group is on the carbon atom adjacent that joined to the oxygen atom of the alkyl glyoxylate hemiacetal. Typically, the R radicals will be methyl, ethyl, propyl, isopropyl, butyl, isobutyl, cyclohexyl, hydroxyethyl, and the like.

Alkyl glyoxylates or their hemiacetals may be prepared by any convenient method. A preferred method to form the hemiacetal is to react an essentially water-free glyoxylic acid with a molar excess of alcohol while removing water formed as a result of the reaction. The resulting alkyl glyoxylate hemiacetal may be recovered from the reaction mixture by vacuum stripping.

Acrylamides useful in the process of the present invention are readily available commercially and have the structure:

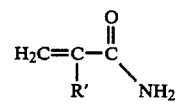

wherein R' is hydrogen or a methyl group.

In carrying out the process of the present invention, an alkyl glyoxylate hemiacetal or an alkyl glyoxylate and acrylamide in essentially equal molar amounts are heated in the presence of a polymerization inhibitor to a temperature in the range of about 50° to about 90° C. until reaction is substantially complete, usually about 1 to 3 hours. Suitable polymerization inhibitors include for example, the methyl ether of hydroquinone, ethylenediamine tetracetic acid, and the like, and the combinations thereof.

After the alkyl acrylamidoglycolate is obtained, it may be isolated for use directly in polymer or copolymer preparation or it may be employed without isolation in the preparation of the alkyl ether thereof.

In preparing the alkyl ethers of the alkyl acrylamidoglycolates, an alcohol in excess of molar requirements and an alkyl acrylamidoglycolate are heated in the presence of an etherification catalyst to reflux temperature. Useful etherification catalysts include sulfuric acid, paratoluenesulfonic acid, and the like. Water removal may be accomplished by azeotropic distillation, if desired, or may be accomplished by vacuum stripping also used to remove excess alcohol. To help prevent premature polymerization of the product, air sparging of the reaction mixture is desirable. After the alcohol and alkyl acrylamidoglycolate have reacted, the excess alcohol is removed by distillation.

This invention is more fully illustrated in the examples which follow.

EXAMPLE A

Preparation of Ethyl Glyoxylate Hemiacetal

Glyoxylic acid monohydrate in the amount of 212 parts (2.25) moles, is charged to a suitable reaction vessel. Hexane, in the amount of 1,943 parts, and 2B ethanol, in the amount of 419 parts (approximately 9 moles) are then added. The mixture is heated to its boiling point at atmospheric pressure. Water is removed continuously using hexane to form the azeotrope. The lower ethanol-rich phase of the condensate (containing most of the water) is removed. Additional 2B ethanol is added to the reactor to compensate for the quantity removed to maintain the ethanol/glyoxylic acid molar ratio in the reaction at 4/1.

When no additional water can be removed (approximately eight hours), the reaction mixture is cooled. Upon cooling the mixture splits into two phases. The phases are separated, the pale green lower phase contains primarily the ethyl glyoxylate hemiacetal and ethanol. The clear colorless upper phase is primarily hexane.

Examination of the products by $^{13}C$ NMR shows about two-thirds is the ethyl glyoxylate hemiacetal and about one-third is the corresponding hemiacetal acid,

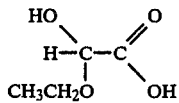

Small amounts of glyoxylic acid monohydrate and ethyl dihydroxyacetate are also found.

The ethyl glyoxylate hemiacetal is isolated from the lower layer by vacuum distillation at 50 mm Hg pressure. A total of 113 parts of essentially pure product containing about 1% water is collected, giving an overall yield of 34% based on the weight of the glyoxylic acid charge.

EXAMPLE B

Preparation of Methylglyoxylate Hemiacetal

A suitable reaction vessel is charged with 4,448 parts of 50% aqueous glyoxylic acid. Water is removed by vacuum stripping at 100 mm Hg pressure. Water removal is continued over a 9 hour time period with reactor temperature ranging from 63° C. to 116° C. Total water removal amounts to 2008 parts.

The stripped glyoxylic acid is cooled to about 85° C. and methanol (3 moles methanol/1 mole glyoxylic acid) is added very gradually. The reaction is rapid and exothermic and temperture can be maintained with a methanol reflux while at least half of the methanol is added. Near the end of the methanol addition, heat is applied. Total methanol addition is 2,890 parts during which the temperature ranges from 78° to 92° C. Reaction time is 2½ hours.

The methyl glyoxylate hemiacetal is removed from the reaction mixture by vacuum stripping at 50 mm Hg pressure. The product, much of which is collected at about 75°-80° C., is about 80% pure, containing methyl dihydroxy acetate (approximately 10%), water (approximately 5%) and 5-10% of unidentified materials. A total of 2,466 parts are collected; overall yield based on the initial weight of glyoxylic acid is estimatd at 50-60%.

EXAMPLE C

Preparation of Butyl Glyoxylate Hemiacetal

The procedure of Example I is followed with the following exceptions. Glyoxylic acid, 50% aqueous, is charged in the amount of 1,000 parts Butanol is added in the amount of 2,000 parts. Water and butanol form an azeotrope and water is removed by azeotropic distillation over 2.5 hours. The reaction mixture is then distilled to give 1,337 parts (71% yield) of butylglyoxylate hemiacetal. The pot residue, 610 parts is butyl glyoxylate acetal (24%).

EXAMPLE I

Preparation of Methyl Acrylamidoglycolate

Methyl glyoxylate hemiacetal obtained from Example B in the amount of 96.3 parts (0.8 mole) is charged into a suitable reaction vessel and 1,000 parts per million of methylether of hydroquinone and 50 parts per million of ethylenediamine tetraacetic acid are added. A nitrogen purge is then started. Acrylamide, in the amount of 56.8 parts (0.8 mole), is charged and the reactor temperature drops from 26° C. to 16° C. as some of the acrylamide dissolves. The mixture is gradually heated and at 40°-45° C., all of the acrylamide is in solution.

The temperature of the reaction mixture is gradually increased to 80°-85° C. and held. After approximately 1 hour in this temperature range, the reactor contents solidify, yielding methyl acrylamidoglycolate.

EXAMPLE II

Preparation of Ethyl Acrylamidoglycolate

Ethyl glyoxylate hemiacetal obtained from Example A in the amount of 29.5 parts (0.2 mole) is employed along with 14.3 parts (0.2 mole) of acrylamide following the procedure of Example I. The reaction is run at 70°-85° C. for 2.5 hours. Analysis of the product by $^{13}C$ NMR shows a 90% conversion with a 90% selectivity to ethyl acrylamidoglycolate ethyl ether are also found.

EXAMPLE III

Preparation of Butyl Acrylamidoglycolate

The procedure of Example I is again followed using the following charge: butyl glyoxylate hemiacetal 315 parts (1.5 moles), acrylamide 110 parts (1.5 moles), methyl ether of hydroquinone 400 parts per million and ethylenediamine tetraacetic acid 200 parts per million. The reaction is run for 3 hours at 60°-65° C. and then by-product butanol is stripped under vacuum. The material is not isolated, instead it is used directly to make butyl acrylamidoglycolate butyl ether.

EXAMPLE IV

Preparation of Methyl Acrylamidoglycolate Methyl Ether

Methyl acrylamidoglycolate, as prepared in Example I, in the amount of 100 parts (0.63 mole) is combined with 200 parts of methanol (6.3 moles), 0.10 parts of the methyl ether of hydroquinone and 0.005 part of ethylene-diamine tetraacetic acid and 5.0 parts of a 40% aqueous solution of paratoluenesulfonic acid is added as catalyst. The reaction mixture is heated for 4 hours at reflux temperature and then cooled and filtered. Vacuum stripping of the methanol results in crystallization of the product. An 85% yield of methyl acrylamidoglycolate methyl ether is obtained.

EXAMPLE V

Preparation of Butyl Acrylamidoglycolate Butyl Ether

The reaction product of Example III is employed. Butanol in the amount of 570 parts (7.7 moles) is added. Sulfuric acid, 2 ml concentrated acid, is added as catalyst and the water is removed by azeotropic distillation at 80°-85° C. under 190 mm Hg pressure over a period of 2.5 hours. An air sparge is used to help prevent premature polymerization of the product. Butanol is then distilled to yield butylacrylamidoglycolate butyl ether in 96% yield.

EXAMPLE VI

Butyl glyoxylate, 130 parts, is blended with 64 parts acrylamide and 1000 parts per million of monomethyl ether of hydroquinone in a suitable reaction vessel. The mixture is slowly heated to 84° C. After 2 hours the mixture is cooled yielding the desired butyl acrylamidoglycolate, which is recrystallized from a suitable solvent.

EXAMPLE VII

Preparation of Butyl Methacrylamidoglycolate

The procedure of example VI was again followed using the following change: butyl glyoxylate butyl hemiacetal 273 parts; methacrylamide 110 parts; methyl ether of hydroquinone 0.27 parts. The reaction was run at 70° to 75° C. for 1.5 hours. The material was not isolated, instead it was used directly to make butyl methylacrylamidoglycolate butyl ether.

EXAMPLE VIII

Preparation of Butyl Methacrylamidoglycolate Butyl Ether

The reaction product of Example VI was employed. Butanol 130 parts, butyl acetate 130 parts, and concentrated sulfuric acid 3.0 parts were added and the water removed by azeotropic distillation under reduced pressure. An air sparge was used to help prevent premature polymerization. Butanol and butyl acetate were then distilled to yield butyl methacryl amidoglycolate butyl ether.

What is claimed is:

1. A process for preparing an alkyl acrylamidoglycolate alkyl ether in solid form wherein the alkyl groups in the ester and ether functionalities are the same, which comprises reacting an acrylamide with an alkyl glyoxylate hemiacetal in essentially equal molar proportions at a temperature in the range of about 50° C. to about 90° C. in the presence of a polymerization inhibitor to yield an alkyl acrylamidoglycolate, reacting said alkyl acrylamidoglycolate in the presence of an etherification catalyst at reflux temperature with an excess of an alcohol selected from the group consisting of aliphatic and cycloaliphatic alcohols of 1-6 carbon atoms and 1,2-dihydroxy alcohols of 2-6 carbon atoms whose alkyl group is the same as the alkyl group in the ester functionality of said alkyl acrylamidoglycolate to yield said alkyl acrylamidoglycolate alkyl ether and removing the excess alcohol by distillation.

2. the process of claim 1 wherein the alkyl glyoxylate hemiacetal is selected from methyl glyoxylate methyl hemiacetal, ethyl glyoxylate ethyl hemiacetal and butyl glyoxylate butyl hemiacetal.

* * * * *